UNITED STATES PATENT OFFICE.

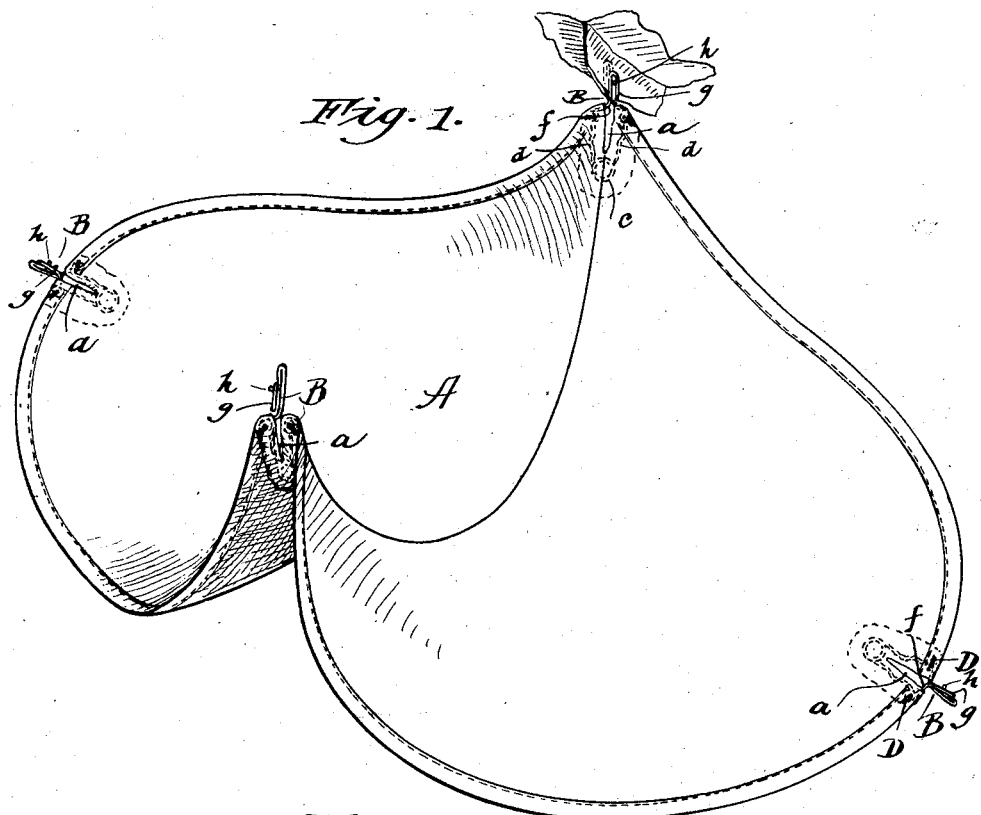

KATHERINE ELLWOOD ALLPORT, OF CHICAGO, ILLINOIS.

DRESS-SHIELD.

No. 919,299.  Specification of Letters Patent.  Patented April 27, 1909.

Application filed May 29, 1908. Serial No. 435,815.

*To all whom it may concern:*

Be it known that I, KATHERINE ELLWOOD ALLPORT, a citizen of the United States, residing at Chicago, in the county of Cook and State of Illinois, have invented certain new and useful Improvements in Dress-Shields, of which the following is a specification.

The object of my invention is to adapt a dress shield for ready attachment to and removal from a garment, the attaching means being so constructed as to afford a secure fastening for the shield and which can be quickly attached and detached. To this end I have devised a metallic fastener, preferably constructed of spring wire, and so fashioned as to provide a pair of spring jaws which will securely clasp a seam or the body of a garment so as to attach the shield thereto.

In order to enhance the convenience and rapidity of application, I preferably construct the fastener in such form and so associate it with the shield that it becomes a permanent part thereof.

To provide for the ready attaching of the fastener to the body of the shield and for its convenient manipulation the shield is provided in its margins at the points where the fastener is to be applied, with cut away portions, preferably V-shaped notches, and the fastener has a body portion of substantially the same shape as the notch or opening and portions of the fastener are secured along the margins of the openings, preferably within a pocket provided by a cover piece of fabric stitched or otherwise secured thereover. This cutting or notching of the fabric not only facilitates the securing of the fastener to the shield but it prevents any wrinkling or doubling of the fabric of the shield which would not only be objectionable to the wearer but would prevent the proper action of the fastener.

In the accompanying drawings Figure 1 is a perspective view of the shield with the fasteners applied thereto, one of them being shown in engagement with a fabric. Figs. 2, 3 and 4 are fragmentary views of the shield showing the fastener applied thereto, Fig. 2 showing the fastener closed, Fig. 3 showing the fastener open and in position to receive the fabric, and Fig. 4 showing the fastener closed with a part of the covering forming the pocket folded back to show the mode of insertion. Fig. 6 shows the fastener of the preferred form in plan and Fig. 5 shows the same in edge view. Figs. 7 and 8 are similar views respectively of a modified form of fastener.

The fastener B of my invention is composed of spring wire and preferably in the form shown in Figs. 5 and 6. In said form, the fastener is composed of a single piece of wire bent or doubled to provide the diverging side members $b$ $b$, united by the coiled portion $c$ and provided preferably with the upwardly offset or bent portions $d$ and with the coils $e$ to afford closed loops for the passage of rivets or other means for securing the fastener to the shield. Beyond said loops the extremities of the fastener are directed inwardly as at $f$. The terminal portion beyond the portion $f$ of one of the members is then doubled upon itself to provide an open keeper $g$, and the other member is also returned or doubled upon itself and terminates in an outwardly projecting point $h$.

The shield A may be of the usual form and constructed of the usual materials. But in order to provide it with permanent fasteners or attaching means it is notched or cut away on its margins at the points where the fastener is to be attached. This notch $a$ is preferably V-shaped and I prefer to attach the fasteners to the shield at its points or apices and also at its side margins so as to afford a secure fastening and also to keep the shield properly distended or stretched and prevent its rolling or wrinkling. The form of the opening or cut may be other than V-shaped and may of course be a mere slit with the edges of the shield adjacent to the slit turned back or folded over the fastener. A greater or less number of the fasteners may be employed and they may be applied at any desired points.

The fastener may be secured to the shield by means of a cover piece C which may be folded or doubled over the margins of the V-shaped opening and secured to the body of the shield by lines of stitching as shown. Preferably this cover piece will be stitched to the shield except at its end $c'$ and the fastener is then put in place by separating its jaws as shown in Fig. 6, and then inserting them through the openings and then stitching the end $c'$ to the shield. But the fastener may be placed upon the shield and the cover piece laid over the fastener and secured to the shield by stitching.

It will be understood of course that when the cover piece is doubled over the fabric of the shield at the edges of the opening it affords pockets for the side members *b* of the fastener and for the eyes *e* thereof. When the cover piece is thus secured to the shield it incloses the coil *c* of the fastener and in order to prevent any movement of the fastener, staples D or other means may be passed through the openings of the coils or loops *e* and through the various layers of the shield and cover piece.

The normal position of the fastener after it is applied to the garment will be that shown in Figs. 1 and 2, wherein it will be seen that the fastener, except for the projecting portions *f*, *g* and *h*, is wholly inclosed and covered by the cover piece and that in such position the edges of the shield between the base members of the fastener are held spread apart and that the clamping members of the fastener cross each other at the portions *f* and that the terminal hook *h* rests within the keeper *g*.

To secure the shield in place the fastener is compressed by applying the thumb and finger to the upwardly offset or bent portions *d* of the side members of the fastener whereupon the clamping members *f* and *g* will be separated as shown in Fig. 3, and then the fastener may be engaged with a seam, selvage or any other part of the garment as indicated in Fig. 3. When the pressure is released the clamping jaws will close upon each other, the point *h* causing the fabric to be forced through the opening of the keeper *g* and serving also to prevent lateral separation of the clamping jaws. These latter are preferably so constructed and proportioned that they do not perforate or penetrate the material to which they are attached, but hold by forcing a portion of the material into and through the opening of the keeper. This opening will preferably be of such width only as will enable the doubled thickness of the fabric and the point *h* of the jaw to enter, the security of the grip being dependent largely upon the friction or clamping effect thus produced between the sides of the point *h* and the sides of the keeper.

The fastener may be constructed in various forms as to the particular configuration of its members, but essentially it comprises two opposed jaws connected to the body members in such a way that the jaws are opened by compressing the side members and closed by spring action.

I have shown the fastener as made with the inclined portions *f* crossing each other and I prefer to so construct the device. I have also shown the side members *b* provided with bends or upstanding portions *d* as these afford a convenient means for manipulating the clamping jaws.

In Figs 7 and 8 I have shown a slightly modified form of fastener, the side members in this case having a series of open loops *i*, and this fastener may be secured direct to the fabric by stitching through these loops and the staples or other independent fastening means dispensed with.

The following general advantages of my invention may be noted: The fastener is of such simple and inexpensive construction that a suitable number thereof to adequately attach the shield in position for use may be applied without prohibitive increase in the cost of the shield, the increased cost being more than offset by the convenience of having the fastening means a permanent part of the shield.

The fastener is made preferably of round wire, because it may thus be made very light and yet have sufficient strength or spring power to afford a secure clasping effect.

The form of the fastener is such that it may be manipulated with the thumb and finger of one hand, the disengagement or separation of the jaws being effected simply by compression of the side members of the fasteners and the reëngagement being automatic or due solely to the tension of the spring.

The form of the fastener is such that it follows the contour of the shield and adapts itself readily to the lines of strain without presenting any clumsy or objectionable features.

The notching of the edges of the shield and the application of the fastener in the manner described permits of the ready manipulation of the latter without the danger of the shield doubling or wrinkling between the members of the fasteners so as to prevent their proper action.

By inserting the fastener into the shield, rather than by attaching it to the edge of the shield, prevents movement and play of the shield which otherwise might allow perspiration to affect the garment intended to be protected by the shield.

The fastener is of such form that it does not interfere with the washing of the shield and its various parts are so constructed that it is not likely to damage the fabric to which it is attached nor to inflict injury in applying it.

The fastener of course may be plated to avoid corrosion and the point *h* should only be sufficiently sharp to insure the fold of the garment being drawn into the keeper and its retention therein.

It will be understood that my invention is not limited to the exact configuration of the fastener nor to the precise method of attaching the same to the shield which is herein shown and described.

I claim:

1. The combination with a dress shield, of a fastener therefor composed of a single piece of wire bent to form spring arms each inclosed within the shield and having terminal portions extending beyond the margin of the shield and formed into coöperating clasping jaws adapted to be opened by compression of the arms and to close by spring action, substantially as described.

2. The combination of a dress shield having a cutaway or notched portion in its margin and a fastener therefor having spring arms secured to the shield along the margins of the cutaway portion and clasping jaws projecting beyond the edge of the shield and adapted to be opened by the compression of the spring members and to close by spring action, substantially as described.

3. The combination of a dress shield having a V-shaped notch in its margin and a fastener therefor composed of a single wire having a spring coil therein with arms diverging from said coil, each of said arms being secured to the body of the shield along the margins of said opening, the terminal portions of said wire extending beyond the edge of the shield and crossing each other to provide clasping jaws adapted to be opened by compression and to close by spring action, substantially as described.

4. The combination with a dress shield having a V-shaped notch in its margin and provided with pockets along the margins of said notch or cutaway portion, and a fastener therefor composed of a single piece of wire bent to provide diverging spring arms adapted to be held within said pockets and the terminal portions of the wire being extended beyond the margins of the shield and crossing each other to provide clasping jaws which open by compression and close by spring action.

5. The combination with a dress shield having cut-away portions or notches in its margin, of a wire fastener having spring arms and clasping jaws, and a fabric cover piece secured to the shield adjacent to the margins of the cut-away portions or notches and inclosing the arms of the fastener, substantially as described.

6. The combination with a dress shield having notched or cut-away portions in its margin, of a fastener therefor composed of a spring wire having compression members inclosed within the margins of said notched or cut-away portions, said compression members provided with integral loops for securing them to the shield and with projecting jaws or clasping members beyond the edges of the shield, substantially as described.

7. The combination with a dress shield having notched or cut-away portions in its margin, of a fastener therefor composed of spring wire having compression members provided with offsets or bends and inclosed within the margins of said openings, and coöperating jaws or clasping members projecting beyond the edges of the shield, substantially as described.

KATHERINE ELLWOOD ALLPORT.

Witnesses:
 C. C. LINTHICUM,
 ALLEN W. MOORE.